United States Patent
Klingner et al.

(10) Patent No.: US 9,773,313 B1
(45) Date of Patent: Sep. 26, 2017

(54) IMAGE REGISTRATION WITH DEVICE DATA

(71) Applicant: Google Inc., Mountain View, CA (US)

(72) Inventors: Bryan Klingner, Oakland, CA (US); Damon Kohler, Munich Bavaria (DE)

(73) Assignee: Google Inc., Mountain View, CA (US)

( * ) Notice: Subject to any disclaimer, the term of this patent is extended or adjusted under 35 U.S.C. 154(b) by 75 days.

(21) Appl. No.: 14/584,151

(22) Filed: Dec. 29, 2014

Related U.S. Application Data (60) Provisional application No. 61/923,415, filed on Jan. 3, 2014.

(51) Int. Cl.
*G06T 7/00* (2017.01)

(52) U.S. Cl.
CPC .. *G06T 7/0024* (2013.01); *G06T 2207/10004* (2013.01); *G06T 2207/10024* (2013.01); *G06T 2207/10028* (2013.01); *G06T 2207/20221* (2013.01)

(58) Field of Classification Search
CPC .............. G06K 9/3233; G06K 9/00771; G06T 7/0081; G06T 7/2006; G06T 2207/20021; G06T 2207/20144; G06T 2207/30252; G06T 2207/30232; G06T 2207/30236; G06T 2207/30241; G06T 7/2033; G06T 2207/10016; G06T 2207/30256; G06T 7/0024; G06T 2207/10004; G06T 2207/10024; G06T 2207/10028; G06T 2207/20221; G06T 7/004; G06T 7/0057; G06T 11/60; G06T 7/0071

USPC ................ 382/103, 106, 282, 284, 294, 309
See application file for complete search history.

(56) References Cited

U.S. PATENT DOCUMENTS

| | | | |
|---|---|---|---|
| 8,510,039 B1* | 8/2013 | Troy ..................... | G01C 21/165 701/436 |
| 8,699,800 B1 | 4/2014 | Chau | |
| 8,761,457 B1* | 6/2014 | Seitz ..................... | G06T 7/0028 382/113 |
| 2005/0129324 A1* | 6/2005 | Lemke ................... | H04N 1/387 382/254 |
| 2012/0306850 A1* | 12/2012 | Balan ................... | G06T 19/006 345/419 |

(Continued)

OTHER PUBLICATIONS

Newcombe et al. "Live Dense Reconstruction with a Single Moving Camera." IEEE Conference on Computer Vision and Pattern Recognition (CVPR), Jun. 13, 2010, pp. 1498-1505.*

(Continued)

*Primary Examiner* — Jon Chang
(74) *Attorney, Agent, or Firm* — Dority & Manning, P.A.

(57) ABSTRACT

Systems and methods for image registration using data collected by an electronic device, such as a mobile device, capable of simultaneous localization and mapping are provided. An electronic device, such as a mobile device, can be can be configured to collect data using a variety of sensors as the device is carried or transported through a space. The collected data can be processed and analyzed to generate a three-dimensional representation of the space and objects in the space in near real time as the device is carried through the space. The data can be used for a variety of purposes, including registering imagery for localization and image processing.

17 Claims, 10 Drawing Sheets

(56) References Cited

U.S. PATENT DOCUMENTS

| | | | | |
|---|---|---|---|---|
| 2013/0127988 A1* | 5/2013 | Wang | ............... | G06T 15/205 |
| | | | | 348/43 |
| 2014/0123507 A1* | 5/2014 | Gupta | ............... | G01B 11/002 |
| | | | | 33/1 M |
| 2015/0009214 A1* | 1/2015 | Lee | ............... | G06T 7/0046 |
| | | | | 345/420 |
| 2015/0062120 A1* | 3/2015 | Reisner-Kollmann | ............... | G06T 7/0042 |
| | | | | 345/419 |
| 2015/0123999 A1* | 5/2015 | Ofstad | ............... | G01C 21/32 |
| | | | | 345/637 |

OTHER PUBLICATIONS

Qian et al. "3D Environmental Mapping of Mobile Robot Using a Low-cost Depth Camera." IEEE International Conference on Mechatronics and Automation, Aug. 4, 2013, pp. 507-512.*

Bansal et al. "Geo-Localization of Street Views with Aerial Image Databases." Proceedings of the 19th ACM International Conference on Multimedia, Nov. 28, 2011, pp. 1125-1128.*

* cited by examiner

IMAGE REGISTRATION WITH DEVICE DATA

PRIORITY CLAIM

The present application claims the benefit of priority of U.S. Provisional Patent Application Ser. No. 61/923,415, filed Jan. 3, 2014, entitled "Image Registration with Device Data" which is incorporated herein by reference.

FIELD

The present disclosure relates generally to processing of data collected by a device capable of simultaneous localization and mapping, and more particularly to image and data registration based at least in part on data collected by a device capable of simultaneous localization and mapping.

BACKGROUND

The advance of wireless and broadband technology has led to the increased use of mobile devices, such as smartphones, tablets, mobile phones, wearable computing devices, and other mobile devices. Such mobile devices are typically capable of being easily carried or transported by a user and used to perform a variety of functions. Certain mobile devices can have various sensors, such as accelerometers, gyroscopes, depth sensors, and other sensors. These mobile devices can also include image capture devices (e.g. digital cameras) for capturing images of a scene, such as the interior or exterior of a building, home, or other space.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method. The method includes obtaining, by one or more computing devices, location data indicative of a location of a mobile device capable of simultaneous localization and mapping. The location data can be determined from one or more motion sensors associated with the mobile device and a sparse point cloud acquired by the mobile device. The method can further include obtaining, by the one or more computing devices, depth data acquired by the mobile device. The depth data can be indicative of the location of one or more surfaces proximate the mobile device. The depth data can be acquired by the mobile device using one or more depth sensors. The method can further include registering, by the one or more computing devices, a first image captured by the mobile device with a second image based at least in part on one or more of the location and the depth data acquired by the mobile device.

Other aspects of the present disclosure are directed to systems, apparatus, tangible non-transitory computer-readable media, user interfaces and devices for registering data.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Reference now will be made in detail to embodiments, one or more examples of which are illustrated in the drawings. Each example is provided by way of explanation of the embodiments, not limitation of the invention. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Overview

Example aspects of the present disclosure are directed to image and data registration using data collected by an electronic device capable of simultaneous localization and mapping (a "SLAM device"). Collection of data for generating representations of spaces can be tedious and can require significant resources. According to example aspects of the present disclosure, an electronic device, such as a mobile device (e.g. a smartphone, tablet, wearable computing device, autonomous image collection device, etc.), can be configured to generate data using a variety of sensors as the device is carried or transported through a space. The collected data can be processed and analyzed to determine the location of the device in the space and to generate a three-dimensional map of the space in near real time. The data collected and generated by the SLAM device can be used to register images captured by the SLAM device. Images captured by the SLAM device can be registered with other imagery, such as geographic imagery stored, for instance, in a geographic information system database or other database of imagery. The registered images can be used, for instance, in providing localization information for the SLAM device and/or for processing of images to generate image compositions.

For example, data can be collected from a SLAM device using one or more motion sensors, depth sensors, and image capture devices as the SLAM device is carried through a space. The collected data can include location data indicative of the location of the SLAM device as it is carried through the space and depth data indicative of the depth or distance to surfaces proximate to the SLAM device. The location data and the depth data can be coordinated with one another to generate a three-dimensional map for the space.

In one particular implementation, the location data can be derived from signals from one or more motion sensors (e.g. an accelerometer, a gyroscope, and/or other motion sensor) and a sparse point cloud of data points generated by the SLAM device. The sparse point cloud of data points can include a plurality of data points representative of points on surfaces proximate to the SLAM device in the space. The sparse point cloud can be generated, for instance, by capturing imagery (e.g. a video) of the space as the SLAM device is carried through the space. Features can be identified in the images using feature identification techniques. The identified features can be tracked through multiple images acquired of the space as the SLAM device is carried through the space to identify the sparse point cloud using, for instance, structure from motion techniques and/or visual odometry. Each tracked feature can correspond to a point in the sparse point cloud. The SLAM device can be configured to determine its approximate location in the space using signals received from the motion sensors and the sparse point cloud.

The depth data can include a dense depth map providing the approximate depth or distance of surfaces relative to the SLAM device as the SLAM device is carried through the space. The dense depth map can be generated, for instance, using one or more depth sensors. The depth sensors can include one or more laser range finders or other suitable depth sensors. In one particular implementation, structured light techniques can be used to generate a dense depth map representative of the geometry of the space proximate to the SLAM device. Structured light techniques can include, for instance, projecting a pattern of pixels on to a surface and analyzing the deformation of the pixels to determine depth data for the surface. The dense depth map can be of high resolution and can include approximate depths for many points along surfaces proximate to the SLAM device.

The depth data can be coordinated with the location data to generate the three-dimensional map for the space. The three-dimensional map can include a plurality of data points indicative of the location of surfaces in the space. The three-dimensional map can include geometry of objects in the space. In this way, data indicative of the geometry of a scene can be obtained as the SLAM device is carried through the scene.

The data collected by the mobile device can be used to register images captured by the SLAM device with other images, such as images stored in a geographic information system database. Registering images can include aligning location information associated with the images and/or coordinate systems associated with the images. For example, data acquired by a SLAM device can be used to match a first image captured by the SLAM device with a second image stored, for instance, in a geographic information system, based on depth data and/or color data for a space. The registered images can be used for a variety of purposes.

For instance, in one implementation, the registered images can be used to provide localization information for a SLAM device. The localization information can be information sufficient for determining and/or refining location data and other data acquired by the SLAM device. For example, the pose (e.g. position and orientation) associated with the first image can be determined and/or refined based at least in part on location information (e.g. pose information) associated with the second image. The depth data and location data collected by the SLAM device can also be transformed to a coordinate system associated with the second image.

As an example, the data collected by the SLAM device can be associated with a first coordinate system. The first coordinate system can have a particular origin, such as the first location a user turned on or otherwise activated the SLAM device. It can be desirable to localize the data associated with the SLAM device to a different coordinate system, such as a coordinate system associated with the Earth (e.g. latitude, longitude, altitude coordinate system). According to example aspects of the present disclosure, the data collected by the SLAM device can be localized to a coordinate system associated with, for instance, imagery stored in a geographic information system, by registering the images captured by the SLAM device with images stored in the geographic information system according to example aspects of the present disclosure.

The present disclosure is discussed with providing localization information for data associated with a SLAM device based on registration of images for purposes of illustration and discussion. Those of ordinary skill in the art, using the disclosures provided herein will understand that example aspects of the present disclosure can be directed to providing localization information based on registration of other data acquired by a SLAM device.

For instance, in example implementations, data acquired by the SLAM device (e.g. sparse point clouds, depth data, images, or other data) can be aligned with data associated with a geographic information system (e.g. imagery, depth data, three-dimensional models, RGBD images, etc.) to provide localization information the depth device. For example, images used to generate interactive panoramic imagery can be captured, for instance, by a camera mounted to a vehicle, plane, backpack carried by a person, or other mode of transport. Structure-from-motion techniques can be used to generate a point cloud from the capture imagery. The SLAM device can register its own captured data against this data set.

In certain embodiments, the registered images can be used for image processing. For instance, the registered images can be used to generate image compositions. An image composition can include, for instance, a combination of one or more portions of different images and/or the processing of a single image based on parameters associated with one or more different images. In particular embodiments, image compositions can be based on modifying the foregrounds, backgrounds, or other portions of the registered images. Generating an image composition can include one or more image processing operations, such as one or more of aligning, normalizing, smoothing, and blending the registered images.

Various embodiments discussed herein may access and analyze personal information about users, or make use of personal information, such as data captured by a SLAM device. In some embodiments, the user may be required to install an application or select a setting in order to obtain the benefits of the techniques described herein. In some embodiments, certain information or data can be treated in one or more ways before it is stored or used, so that personally identifiable information is removed. For example, in some embodiments, a user's identity may be treated so that no personally identifiable information can be determined for the user.

Example Devices Capable of Simultaneous Localization and Mapping

Figure 1:
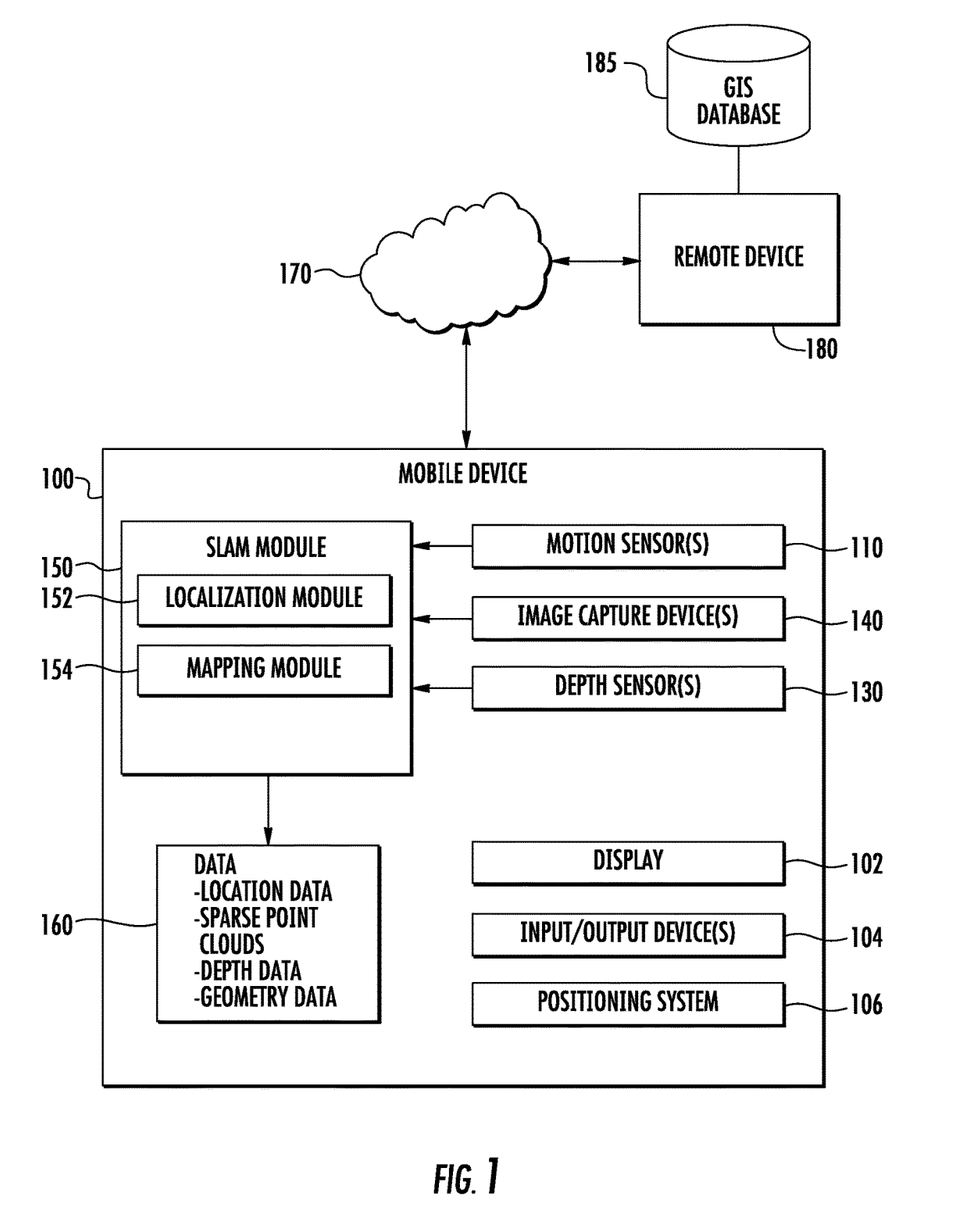
FIG. 1 depicts an example device capable of simultaneous localization and mapping according to example embodiments of the present disclosure.

FIG. 1 depicts an example SLAM device 100 capable of simultaneous localization and mapping according to example aspects of the present disclosure. The SLAM device 100 can be any suitable electronic device. In a particular example embodiment, the SLAM device 100 can be a mobile device (e.g. a smartphone, tablet, mobile phone, wearable computing device, autonomous image collection device, etc.) capable of being easily carried or transported by a user.

The SLAM device 100 can include one or more processors and one or more memory devices including one or more tangible, non-transitory computer-readable media. The computer-readable media can store computer-readable instructions that when executed by one or more processors cause one or more processors to perform operations, such as operations to implement any of the methods or functionality disclosed herein.

As shown in FIG. 1, the SLAM device 100 can include a display 102 (e.g., a touchscreen), various input/output devices 104 for providing and receiving information from a user, such as a touch pad, data entry keys, speakers, and/or a microphone suitable for voice recognition, and a positioning system 106. The positioning system 106 can be configured to determine the position of the SLAM device 100 based on satellite positioning technology and/or proximity to one or more wireless or cellular network access points or using other positioning techniques.

The SLAM device 100 can include various sensors and other devices for simultaneous localization and mapping of the SLAM device 100. For instance, the SLAM device 100 can include one or more motion sensors 110, depth sensors 130, and image capture devices 140. Signals, images, and information generated by the one or more motion sensors 110, depth sensors 130, and image capture devices 140 can be processed using a simultaneous localization and mapping (SLAM) module 150 to generate and process data 160 associated with the space through which the SLAM device 100 is carried.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible non-transitory computer-readable storage medium such as RAM, hard disk or optical or magnetic media. When software is used, any suitable programming language or platform can be used to implement the module.

More particularly, the motion sensors 110 can be configured to generate signals based on various aspects of movement and/or orientation of the SLAM device 100. For instance, the one or more motion sensors 110 can include an accelerometer and/or a gyroscope to determine the relative orientation of the SLAM device 100 as the SLAM device 100 is carried or transported through a space. Signals from the one or more motion sensors 110 can be used in combination with signals and information collected by the one or more depth sensors 130, and the one or more image capture devices 140 to generate location data, depth data, and a three-dimensional map for the space.

The one or more image capture devices 140 (e.g. digital cameras) can be used to generate a sparse point cloud of data points associated with points on surfaces proximate to the SLAM device 100 as it is carried through the space. The sparse point cloud can include a plurality of data points associated with metadata providing the approximate location of the data point (e.g. the distance to the SLAM device 100) as well as a color or texture associated with the data point. The one or more image capture devices 140 can capture imagery (e.g. a video) of the space as the SLAM device 100 is carried through the space. The imagery can be then be processed (e.g. using structure-from-motion techniques and/or visual odometry) to identify and track features through the imagery. The tracked features can correspond to data points in the sparse point cloud.

The one or more depth sensors 130 can acquire a dense depth map indicative of the depth of surfaces proximate the SLAM device 100 as the SLAM device 100 is carried or transported through the space. The dense depth map can be of relatively high resolution and can be used to generate a three-dimensional map of a space. The one or more depth sensors 130 can include any suitable depth sensor, such as one or more laser range finders. In particular example embodiments, the one or more depth sensors 130 can include structured light devices capable of acquiring depth data for surfaces proximate the SLAM device 100 using structured light techniques. Structured light techniques can project a pattern (e.g. light pattern or infrared pattern) onto surfaces. Imagery captured of the pattern by the one or more image capture devices 140 can be analyzed to identify the dense depth map.

The sparse point cloud can be analyzed by a localization module 152 in conjunction with signals received from the one or more motion sensors 110 to identify the location of the device in the space. For instance, the sparse point cloud can be registered against previously acquired data associated with the space to determine the approximate location of the SLAM device 100 as it is carried through the space. Data, such as depth and/or color data, can be registered not just to other imagery, but also to other data, such as depth data, three-dimensional models, depth-annotated imagery, or other suitable data. The signals from the motion sensors 110 can be used to refine the location and orientation of the SLAM device 100 in the space. A mapping module 154 can coordinate the high resolution depth data acquired by the depth sensors 130 with the location data determined by the localization module 152 to generate a three-dimensional representation or map of the geometry of the space and any objects located in the space.

The three-dimensional map and location data can be refined using relocalization techniques. For instance, the SLAM device 100 can recognize that it has visited a location in the space that the SLAM device 100 has previously visited. The SLAM device 100 can align depth data collected by the SLAM device 100 based on the realization that the device has previously visited the same location. For instance, depth data acquired at the location can be aligned (registered) with previously collected depth data and/or color data acquired at the location. According to particular aspects of the present disclosure, the data acquired by the SLAM device can be registered with depth data or imagery stored, for instance, in a geographic information system or other database for localization of the SLAM device.

The data 160 collected and generated by the SLAM device 100 as it is carried or transported through the space can be stored in a memory. The data 160 can include, for instance, location data as determined by the location module 152, sparse point clouds obtained, for instance, by the one or more image capture devices 140, depth data obtained, for instance, by the one or more depth sensors 130, and geometry data generated, for instance, by the mapping module 154.

Figure 2:
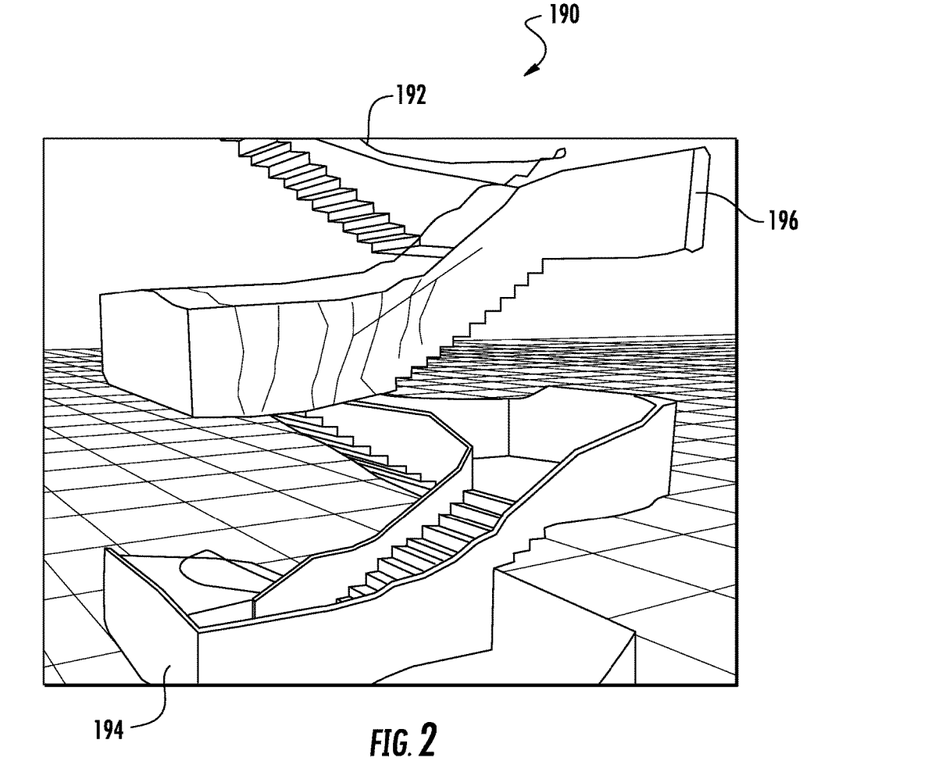
FIG. 2 depicts a graphical representation of an example set of data collected by an example device capable of simultaneous localization and mapping according to example embodiments of the present disclosure.

FIG. 2 depicts a graphical representation of an example set of data 190 collected by a SLAM device 100 as it is carried through an interior space, such as a stairwell. For instance, the data 190 includes a trace 192 indicative of the location of the SLAM device 100 as it is carried through the stairwell. The trace 192 can be determined using localization techniques based on signals received from the motion sensors and/or the sparse point cloud collected by the SLAM device. The example set of data 190 further includes a dense depth map 194 collecting using one or more depth sensors. The dense depth map 194 can include a plurality of data points indicative of a location or depth to surfaces relative to the SLAM device 100 as it is carried through the stairwell. The dense depth map 194 and the location information represented by trace 192 can be combined to generate a three-dimensional map 196 of the stairwell as the SLAM device 100 is carried through the space.

The data 160 collected and generated by the SLAM device 100 can be used for a variety of purposes. In certain example embodiments, the data 160 can be communicated over a network 170 via a network interface to a remote computing device 180. The remote computing device 180 can include one or more processors and a memory including one or more tangible non-transitory computer-readable media storing computer-readable instructions that when executed by the one or more processors cause the one or more processors to perform operations, including generating and/or enhancing representations of spaces according to example embodiments of the present disclosure as will be discussed in detail below.

In particular implementations, the remote computing device 180 can access a geographic information system database 185 or other database. A geographic information system can store or index information according to geographic coordinates of its elements and can include, for instance, a mapping service or virtual globe application. The geographic information system database 185 can store imagery, such as panoramic imagery, map imagery, satellite imagery, aerial imagery, three-dimensional models, or other imagery of a geographic area. According to example aspects of the present disclosure, the data acquired by the SLAM device, including images acquired by the SLAM device, can be registered with data stored in the geographic information system database 185 (e.g. imagery, geometry data, three-dimensional models, etc.) to be used for localization of the data acquired by the SLAM device.

Example Methods for Data Registration

Figure 3:
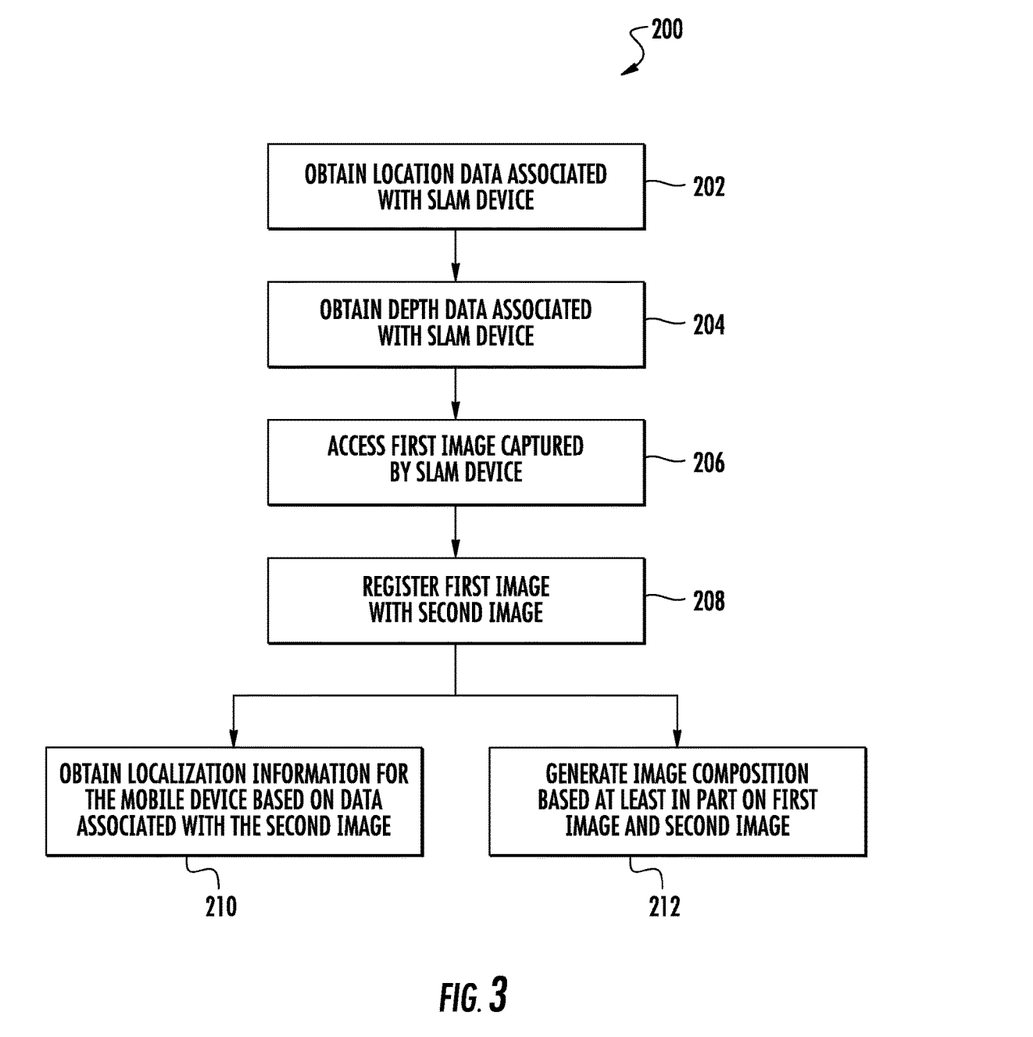
FIG. 3 depicts a flow diagram of an example method according to example embodiments of the present disclosure.

FIG. 3 depicts a flow diagram of an example method (200) for data registration according to example embodiments of the present disclosure. The method (200) can be implemented by one or more computing devices. In addition, FIG. 3 depicts steps performed in a particular order for purposes of illustration and discussion. Those of ordinary skill in the art, using the disclosures provided herein, will understand that various steps of any of the methods disclosed herein can be modified, omitted, rearranged, expanded, and/or adapted in various ways without deviating from the scope of the present disclosure.

At (202), the method can include obtaining location data collected by a SLAM device. The location data can provide the location of the SLAM device as it is carried through a space. The location data can be generated using signals received from motion sensors on the SLAM device in addition to a sparse point cloud of data points generated using one or more images captured by the SLAM device. The sparse point cloud can include a plurality of data points associated with metadata providing the approximate location of the data point as well as a color associated with the data point.

At (204), the method includes obtaining depth data collected by the SLAM device. The depth data can provide the depth to surfaces proximate the SLAM device. The depth data can be a dense depth map acquired by various depth sensors on the SLAM device, such as laser range finders and/or structured light sensors.

Figure 4:
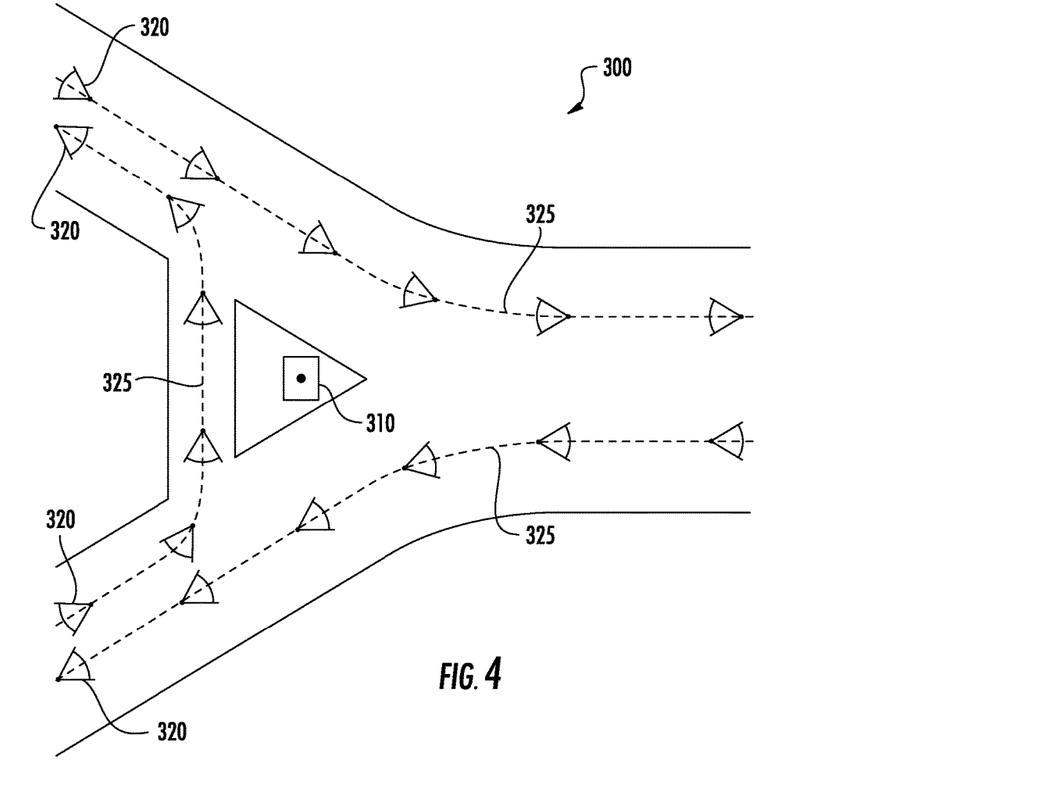
FIG. 4 depicts the example acquisition of data associated with a scene from a plurality of different perspectives by one or more devices capable of simultaneous localization and mapping according to example embodiments of the present disclosure.

FIG. 4 depicts the example capture of data by a SLAM device as one or more SLAM devices are carried through a scene 300 containing an object 310. The object 310 can be a work of art, monument, building, or other object or point of interest. A SLAM device 320 can be carried or transported through the scene 300 along path 325. As demonstrated, the SLAM device 320 can capture imagery and depth data of the scene, including object 310, from a variety of different camera perspectives as the first SLAM device is carried or transported through the scene 300.

Referring again to FIG. 3, at (206), a first image captured by the SLAM device can be accessed. The first image can be an image captured by one or more of the image captured devices associated with the SLAM device and/or can include one or more frames of a video captured by the SLAM device. The first image can have associated location data and depth data. The location data can include an estimated pose of the first image. The location data can be associated with a coordinate system associated with the SLAM device, such as a coordinate system having an origin determined based at least in part on activation of the SLAM device. The location data associated with the first image can be determined based at least in part on location data acquired by the SLAM device. The first image can additionally be associated with depth data. The depth data can provide depth information for one or more pixels in the first image. The depth data can be determined from, for instance, a sparse point cloud acquired by the SLAM device or dense depth data acquired by the SLAM device using one or more depth sensors.

At (208) of FIG. 3, the data collected by the mobile device can be utilized to register images captured by the SLAM device. For example, the depth data and/or color data for images captured by the SLAM device can be matched with depth data and/or color data from other imagery, such as imagery stored in a geographic information system (e.g. panoramic imagery, map imagery, three-dimensional models, etc.) or other imagery database.

Figure 5:
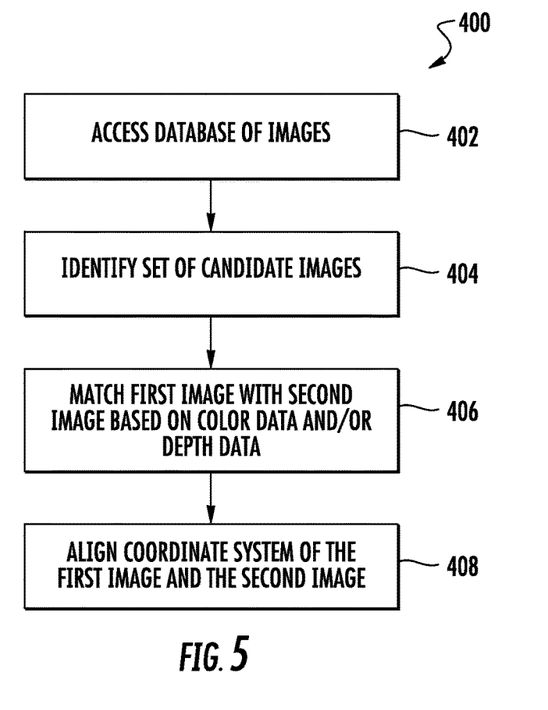
FIG. 5 depicts a flow diagram on an example method for image registration according to example embodiments of the present disclosure.

FIG. 5 depicts one example method (400) for registering a first image with a second image based on data collected by a device capable of simultaneous localization and mapping according to example aspects of the present disclosure. At (402), a database of images can be accessed. For instance, a geographic information database storing geographic imagery can be accessed. The database can store a plurality of geographic images of different geographic areas. The geographic imagery can include, for instance, interactive panoramic imagery (e.g. street level imagery), map imagery, satellite imagery, aerial imagery, three-dimensional models (e.g. polygon meshes with geographic imagery texture mapped to the polygon meshes), and/or other geographic imagery.

At (404), a set of candidate images can be identified. The set of candidate images can be a subset of the images stored in the database of images. The set of candidate images can be identified using data collected by the SLAM device, such as location data. For instance, the location data collected by the SLAM device can indicate that the SLAM device was located in a particular geographic area when the first image was captured by the SLAM device. The location data can be used to identify a set of candidate images associated with the particular geographic area for possible registration of the first image. As an example, location data collected by a positioning system for the SLAM device can indicate that the first image was captured in a particular neighborhood in San Francisco. The location data can be used to identify candidate images in the database of images associated with the same neighborhood in San Francisco for registration.

At (406), the first image can be matched with a second image. The second image can be one of the identified candidate images. The first image can be matched based on various parameters. For instance, in one embodiment, the first image can be matched based on color data. The color data can be derived from, for instance, the colors of one or more pixels of the first image and/or colors associated with data points in a point cloud associated with the first image. In addition and/or in the alternative, the first image can be matched based on depth data associated with the first image. For instance, surfaces represented by depth data for the first image can be matched with surfaces represented by depth data or geometry data associated with the second image. As discussed above, the depth data associated with the first image can be derived from the point cloud and/or the dense depth data acquired by the SLAM device. The depth data associated with the second image can be stored, for instance, as part of the data associated with the image in a geographic information system database or other database.

At (408), the method can include aligning a coordinate system associated with the first image with a coordinate system associated with the second image. For instance, the first image can be associated with a first coordinate system. The first coordinate system can be associated with the SLAM device. The second image can be associated with a second coordinate system that is different from the first coordinate system. For instance, the second image can be associated with a coordinate system used to store and index data in a geographic information system. Aligning the coordinate system of the first image with the coordinate system of the second image can include adjusting the coordinate system of the first image so that matched features (e.g. matched color data and/or matched depth data) are associated with the same coordinates.

Once registered, the images can be used for a variety of purposes. For instance, at (210) of FIG. 3, localization information can be obtained for the mobile devices based on data associated with the second image. The localization information can be used to refine the data collected by the SLAM device so that it is more accurately aligned with real world coordinates. More particularly, once the first image is registered with the second image, location data associated with the second image can be used to adjust location data associated with the first image so that the location data for the two images is aligned. Based on this aligned data, other data collected by the SLAM device can be more adjusted to more accurately reflect its true location.

Figure 6:
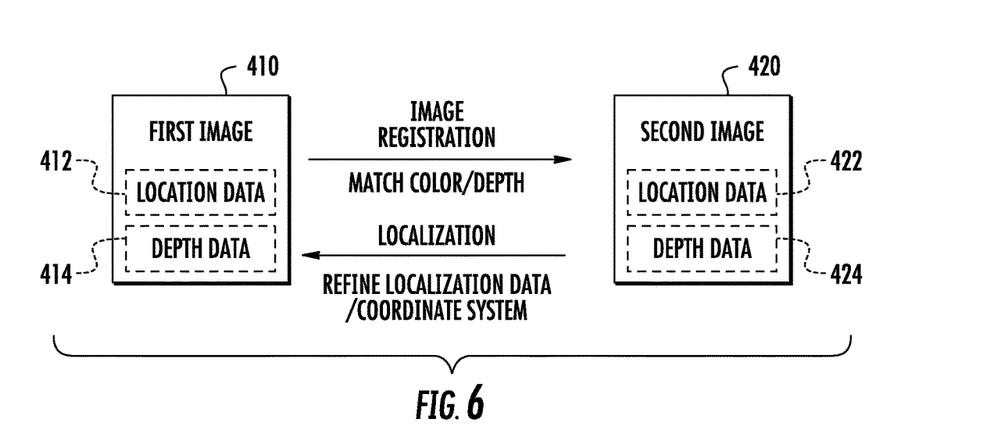
FIG. 6 depicts example image registration and localization according to example aspects of the present disclosure.

FIG. 6 depicts a conceptual diagram of localization based on image registration according to example aspects of the present disclosure. As shown, a first image 410 acquired by a SLAM device can be associated with both location data 412 and depth data 414. The location data 412 can be derived from location data acquired by the SLAM device. The depth data 414 can be derived from depth data acquired by the SLAM device, such as a sparse point cloud or dense depth data acquired by one or more depth sensors.

The location data 412 and/or the depth data 414 can be used to register the first image 410 with a second image 420 associated with, for instance, a geographic information system. The second image 420 can be associated with location data 422 and depth data 424. The location data 422 and depth data 424 can be stored in the geographic information system and can be known to high degree of accuracy. The first image 410 can be registered with the second image 420 by matching color data and/or depth data associated with the first image with color data and/or depth data associated with the second image 420.

Once registered, the location data 422 associated with the second image can be used to determine localization information for the first image 410. For instance, adjustments to the location data 412 and other data associated with the first image 410 can be determined such that the location data 412 is more aligned with the location data 422. Moreover, the coordinate system associated with the first image can be adjusted to be more aligned with a coordinate system associated with the second image.

In addition to localization, the registered images can be used for image processing. For instance, as shown at (212) of FIG. 3, the registered images can be used for generating image compositions. Example techniques for generating image compositions according to example embodiments of the present disclosure will be discussed in detail below.

Example Image Processing Based on Image Registration

According to example embodiments of the present disclosure, the data collected by a SLAM device can be used to register imagery for purposes of image processing, such as for generating image compositions. The image compositions can use aspects of the registered images to enhance imagery associated with a scene. The enhanced imagery can then be provided or stored as part of, for instance, a geographic information system.

In one example, image compositions can be generated from portions of the registered imagery to generate a clean image of a scene without clutter objects in the foreground or background of the image. For instance, portions of imagery including visual obstructions can be replaced with corresponding portions of registered imagery to generate the image composition without clutter objects. In this way, images registered using data collected by a SLAM device according to example aspects of the present disclosure can be used to generate an image composition that shows an object such as a building, monument, landscaping, or the like that is absent of visual obstructions such as bystanders, cars, or obstructions.

Figure 7:
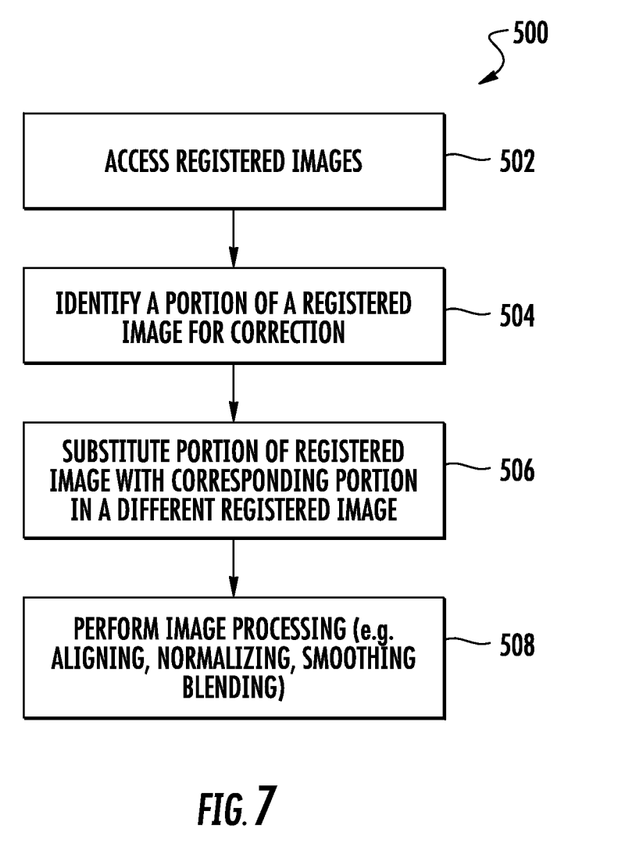
FIG. 7 depicts a flow diagram of an example method for generating an image composition according to example aspects of the present disclosure.

FIG. 7 depicts a flow diagram of one example method (500) of generating an image composition for the purpose of removing clutter objects from a scene according to example aspects of the present disclosure. At (502), the registered images can be accessed. The registered images can include, for instance, an image captured of a scene by a SLAM device and an image captured of the same scene stored, for instance, in a geographic information system or other imagery database. The images can be registered using data collected by the SLAM device according to example aspects of the present disclosure.

Figure 8:
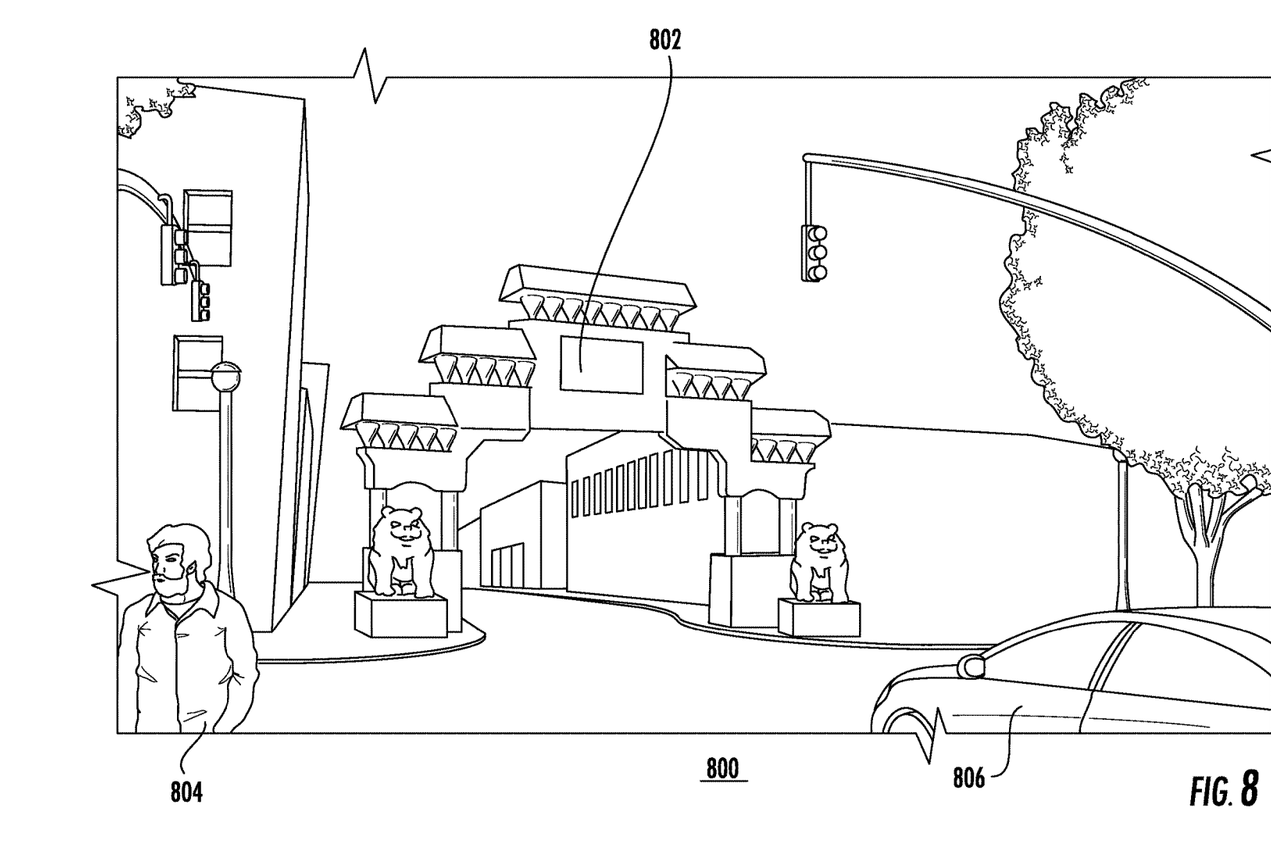
FIG. 8 depicts an example registered image for processing to generate an image composition according to example aspects of the present disclosure.

FIG. 8 depicts one example registered image 800 that can be used to generate an image composition according to example embodiments of the present disclosure. The image 800 can be acquired by a SLAM device. The image 800 depicts a monument 802 with a person 804 and a car 806 in the foreground of the scene. It can be desirable to generate an image composition from the image 800 with the person 804 and the car 806 removed from the foreground of the scene to provide a clearer view of the monument.

Figure 9:
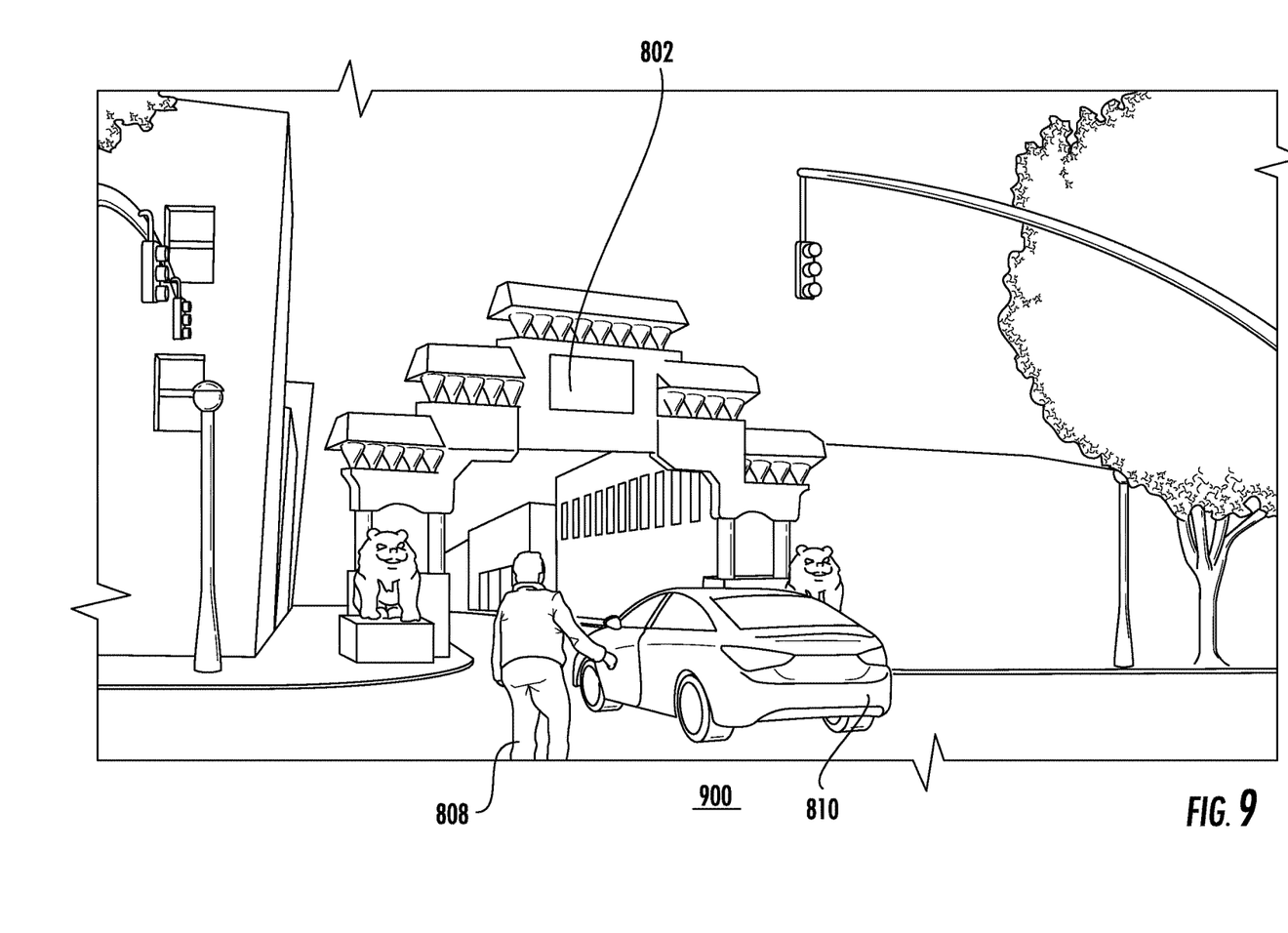
FIG. 9 depicts an example registered image for processing to generate an image composition according to example embodiments of the present disclosure.

FIG. 9 depicts an example image 900 than can be registered with image 800 of FIG. 8. The image 900 of FIG. 9 can be a geographic image stored, for instance, in a geographic information system database or other suitable imagery database. The images 800 and 900 can be registered based on data collected by a SLAM device according to example aspects of the present disclosure. As shown, the image 900 can also depict the monument 802. The image 900 can also include a different person 808 and a different car 810 depicted at different locations in the scene relative to the image 800 of FIG. 8.

Referring to FIG. 7 at (504), the method can include identifying a portion of at least one of the registered images for correction. For example, portions of image 800 of FIG. 8 depicting the person 804 and the car 806 can be identified for removal. As another example, portions of image 900 depicting the person 808 and the 810 can be identified for removal.

Figure 10:
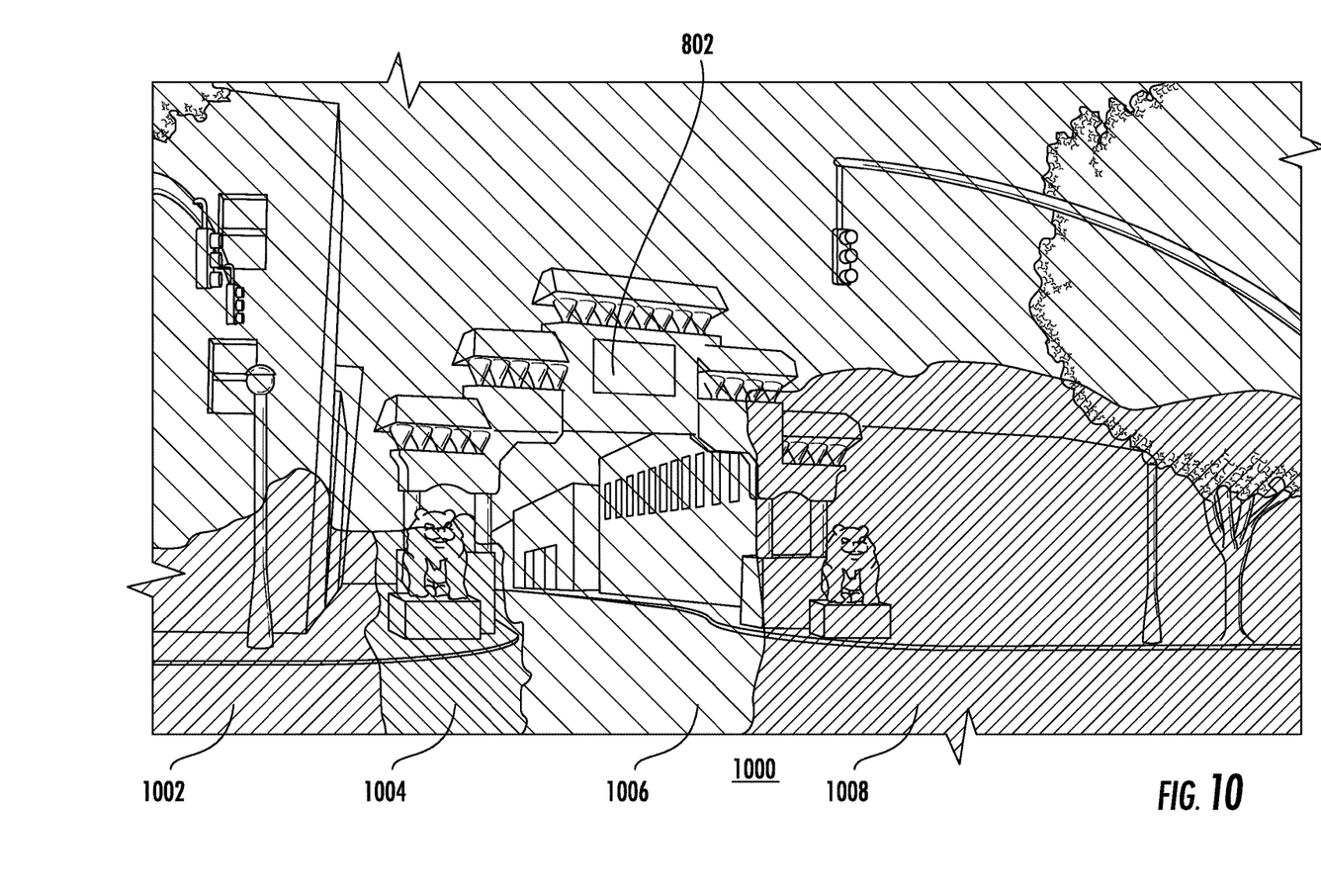
FIG. 10 depicts the example processing of an image according to example embodiments of the present disclosure.

At (506) of FIG. 7, the method can include substituting the identified portion with a corresponding portion in a different registered image. For instance, FIG. 10 depicts an example preliminary image composition 1000. The image 1000 includes portions of images, where objects, such as the person 804 and the car 806, are removed or erased. These portions of the scene are substituted with corresponding portions in registered images without the removed object.

In the example of FIG. 10, the base image can be image 800 of FIG. 8 showing monument 802. Patches 1002, 1004, 1006, and 1008 have been substituted into image 800 to remove the person 804 and car 806 from the scene. The patches 1002, 1004, 1006, and 1008 can be identified from imagery registered with image 800 according to example aspects of the present disclosure. For instance, the patches 1002, 1004, 1006, and 1008 can be identified at least in part from image 900 of FIG. 9 that is registered with image 800 of FIG. 8.

Referring to FIG. 7 at (508), further image processing can be performed to enhance the image composition. For example, in order to generate high-quality compositions, various algorithms can be applied that align, normalize, smooth, and blend images used in each generated composition. An alignment algorithm can be applied that aligns images when generating compositions. A normalization algorithm can perform color adjustments and color voting to the images when generating compositions. A smoothing algorithm can be applied to the images in order to smooth the pixel votes using an energy minimization algorithm. A blending algorithm can perform blending on stitch boundaries in order to reduce artifacts. In some implementations, a modeling algorithm can be utilized for color modeling with random forests. In some implementations, the modeling algorithm can use a random forest classifier to discriminate between foreground/background pixels. More complex techniques for composition generation can be used without deviating from the scope of the present disclosure.

Figure 11:
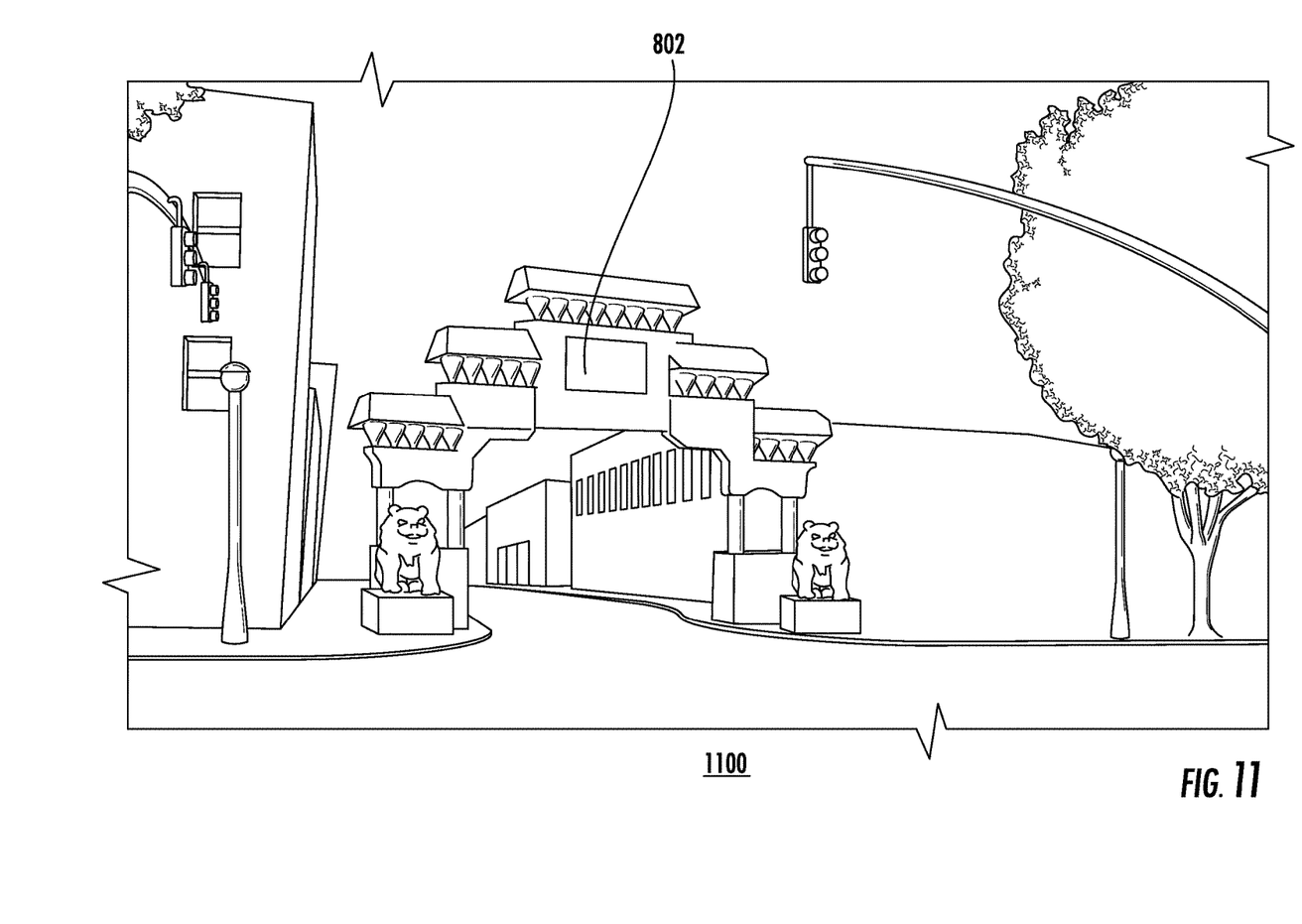
FIG. 11 depicts an example image composition generated according to example embodiments of the present disclosure.

FIG. 11 illustrates an example image composition 1100 generated using registered images according to example embodiments of the present disclosure. FIG. 11 shows monument 802 without particular objects (e.g., people, cars, etc.) blocking the view of monument 802. The image 1100 can be stored in a geographic information system or other image database to provide enhanced representations of the scene. In this way, enhanced imagery can be generated that eliminates unwanted foreground or background objects by blending clutter-free portions from multiple images available through image registration. While some example implementations are described in the context of a monument, such implementations and others may apply to other objects (e.g., buildings, landscapes, etc.). Once generated, the image compositions can be used for a variety of purposes.

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:
1. A computer-implemented method, comprising:
obtaining, by one or more computing devices, location data indicative of a location of a mobile device, the location data determined from one or more motion sensors associated with the mobile device and a sparse point cloud acquired by the mobile device;
obtaining, by the one or more computing devices, depth data acquired by the mobile device, the depth data indicative of the location of one or more surfaces proximate the mobile device, the depth data acquired by the mobile device using one or more depth sensors;

identifying, by the one or more computing devices, one or more candidate images from a geographic information database, the one or more candidate images being identified based at least in part on the location data; and registering, by the one or more computing devices, a first image captured by the mobile device with a second image that is one of the one or more candidate images based at least in part on one or more of the location data and the depth data acquired by the mobile device.

2. The method of claim 1, wherein registering, by one or more computing devices, the first image captured by the mobile device with the second image comprises associating the first image with a coordinate system corresponding to the second image.

3. The method of claim 1, wherein the first image is registered with the second image based at least in part by matching color data associated with the first image with color data associated with the second image.

4. The method of claim 1, wherein the first image is registered with the second image based at least in part by matching depth data associated with the first image with depth data associated with the second image, wherein the depth data associated with the first image is determined based at least in part from one or more of the sparse point cloud and the depth data acquired by the mobile device.

5. The method of claim 1, further comprising obtaining localization information for the mobile device based at least in part on location information associated with the second image.

6. The method of claim 5, wherein obtaining localization information for the mobile device comprises refining the location data acquired by the mobile device based at least in part on the location information associated with the second image.

7. The method of claim 5, wherein obtaining localization information for the mobile device comprises associating the location data acquired by the mobile device with a coordinate system corresponding to the second image.

8. The method of claim 1, wherein the method comprises performing, by the one or more computing devices, one or more of an aligning, normalizing, smoothing, and blending process on the image composition.

9. The method of claim 1, wherein the second image is a geographic image.

10. The method of claim 1, wherein the one or more computing devices comprise the mobile device.

11. The method of claim 1, wherein the method further comprises generating, by the one or more computing devices, an image composition based at least in part on the first image and the second image.

12. The method of claim 11, wherein generating, by the one or more computing devices, the image composition comprises removing, by the one or more computing devices, at least one object depicted in the first image or the second image.

13. The method of claim 12, wherein removing, by the one or more computing devices, the at least one object comprises substituting, by the one or more computing devices, a portion of the first image with a portion of the second image.

14. A computing system, the computing system comprising:

one or more processors; and one or more memory devices, the one or more memory devices storing computer-readable instructions that when executed by the one or more processors cause the one or more processors to perform operations, the operations comprising:

obtaining location data indicative of a location of a mobile device, the location data determined from one or more motion sensors associated with the mobile device and a sparse point cloud acquired by the mobile device;

obtaining depth data acquired by the mobile device, the depth data indicative of the location of one or more surfaces proximate the mobile device, the depth data acquired by the mobile device using one or more depth sensors;

identifying one or more candidate images from a geographic information database, the one or more candidate images being identified based at least in part on the location data; and registering a first image captured by the mobile device with a second image that is one of the one or more candidate images based at least in part on one or more of the location data and the depth data acquired by the mobile device.

15. The computing system of claim 14, wherein the operations further comprise obtaining localization information for the mobile device based at least in part on data associated with the second image.

16. One or more tangible, non-transitory computer-readable media storing computer-readable instructions that when executed by one or more processors cause the one or more processors to perform operations, the operations comprising:

obtaining data acquired by a mobile device, the data comprising location data indicative of a location of the mobile device, the location data determined from one or more motion sensors associated with the mobile device and a sparse point cloud acquired by the mobile device, the data further comprising depth data acquired by the mobile device, the depth data indicative of the location of one or more surfaces proximate the mobile device, the depth data acquired by the mobile device using one or more depth sensors;

accessing data associated with a geographic information system, the data associated with a geographic information system associated with a different coordinate system than the data acquired by the mobile device;

identifying one or more candidate images from the data associated with the geographic information system, the one or more candidate images being identified based at least in part on the location data; and registering the data acquired by the mobile device with the data associated with the geographic information system based at least in part on matching images or depth data captured by the mobile device with one or more images or depth data associated with the geographic information system.

17. The one or more tangible, non-transitory computer-readable media of claim 16, wherein the method comprises adjusting the coordinate system of the data acquired by the mobile device based at least in part on the data associated with the geographic information system.

* * * * *